Figure 2:
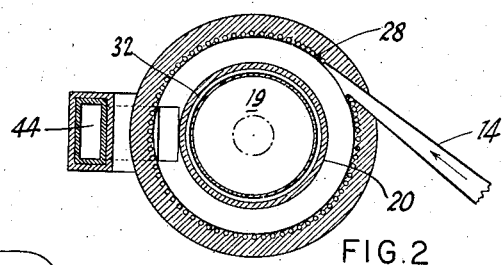

April 14, 1959    A. SIFRIN    2,881,719

CYCLONE FURNACE

Filed Dec. 27, 1950

INVENTOR
*Andreas Sifrin*
BY
*J. P. Moran*
ATTORNEY

United States Patent Office 2,881,719
Patented Apr. 14, 1959

2,881,719
CYCLONE FURNACE

Andreas Sifrin, Oberhausen, Rhineland, Germany, assignor to The Babcock & Wilcox Company, Rockleigh, N.J., a corporation of New Jersey Application December 27, 1950, Serial No. 202,980
In Germany July 8, 1949

Public Law 619, August 23, 1954
Patent expires July 8, 1969

3 Claims. (Cl. 110—28)

The present invention relates to the construction and operation of cyclone type furnaces for burning ash-containing solid fuels in a relatively coarsely pulverized or "granular" condition at furnace chamber temperatures above the ash fusion temperature to thereby permit the removal of the incombustible ash residue from the furnace chamber as a liquid slag, and more particularly to furnaces of the character described in which the gaseous products of combustion are discharged from the furnace chamber adjacent the point of entry of the combustible mixture of fuel and air.

The "granular" fuels normally used in such furnaces have particle sizes of ⅜″ and under, and contain as a result of the fuel crushing operation a proportion of dust-like particles, known as "fines." The fuel and air mixture is introduced into the combustion chamber at a high velocity through a tangential inlet arranged to effect a whirling motion of the fuel and air mixture in a helical path axially of and toward the opposite end of the furnace. In operation, the entering fuel and air stream is rapidly ignited and the centrifugal effect of the whirling stream causes the ash particles released from the burning fuel particles to deposit in a molten condition on the furnace wall and form a film or layer of molten slag thereon on which the larger fuel particles are caught and burned. In the operation of such furnaces there is a tendency for the finer fuel particles to separate from the main fuel and air stream and be carried out in an unburned condition by the slag, resulting in a loss of unburned combustibles. This would be particularly important in a cyclone furnace arranged about a vertical axis, and having both its fuel and air inlet and gas outlet at the upper end thereof and a slag outlet at the lower end thereof. With such an arrangement any fuel particles falling out of the whirling stream of fuel and air are liable to be carried away in an unburned condition through the slag outlet in the bottom of the furnace chamber.

In accordance with the present invention such unburned carbon losses are avoided or minimized in cyclone furnaces of the character described by the provision of an elongated conical extension of the furnace chamber at the end thereof opposite the gas outlet, and the introduction of a regulable supply of secondary combustion air into the furnace chamber at that end to aid in returning the separated fine particles to the main combustion zone. To avoid undesirable cooling of the slag on the furnace chamber walls and discharging from the slag discharge opening, the secondary combustion air is advantageously preheated by the admixture of heating gases recirculated from the furnace chamber.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Figure 1:
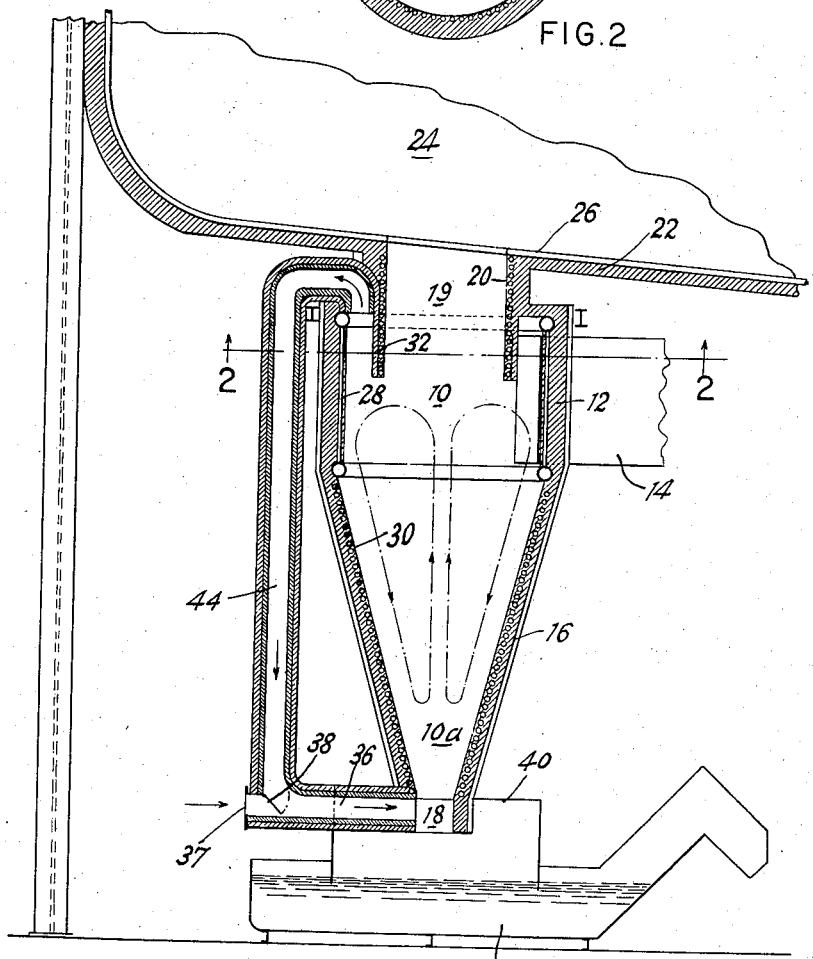

Of the drawings:

Fig. 1 is a somewhat diagrammatic sectional elevation of a vertical cyclone furnace constructed in accordance with my invention, and the adjacent portion of a secondary combustion chamber in an associated water tube steam boiler; and Fig. 2 is a horizontal section taken on the line 2—2 of Fig. 1.

As shown in the drawings, the combustion chamber of the cyclone furnace illustrated has an upper substantially cylindrical portion 10 defined by a circular wall 12 arranged about a vertical axis and having one or more tangentially arranged tapering nozzles 14 for supplying a combustible mixture of granular fuel and primary combustion air thereto. The combustion chamber also includes a lower downwardly tapering frusto-conical section 10ᵃ formed by a correspondingly shaped circular wall 16 extending downwardly from the wall 12 to a slag outlet 18 at the lower end thereof. At the upper end of the combustion chamber is arranged a concentric gas outlet 19, defined by a throat member 20 extending downwardly below the level of the combustion chamber roof and terminating at its upper end in a substantially horizontal floor 22 of a secondary combustion chamber 24 of an associated steam boiler. The secondary combustion chamber floor 22 is lined with water tubes 26 which are bent around the discharge end of the throat member 20, to permit the discharge of gases from the cyclone furnace therebetween and to allow molten slag separated in the secondary combustion chamber to pass downwardly into the gas outlet 19. The walls 12, 16 and 20 of the combustion chamber and gas outlet are lined with refractory covered water tubes 28, 30 and 32 respectively, which are connected in any suitable manner into the fluid circulation system of the associated steam boiler.

At the lower end of the combustion chamber section 10ᵃ is connected a conduit 36 opening to the chamber through one side of the slag outlet 18. The outer end 37 of the conduit opens to the atmosphere and a flow of secondary combustion air is induced therethrough and controlled by a valve 38. The described arrangement is suitable when the boiler furnace 24 is normally operated under a sub-atmospheric pressure effected by draft producing means. If the furnace 24 is to be operated under a super-atmospheric pressure, the air inlet 37 would be connected to a suitable source of super-atmospheric air.

The lower end of the slag outlet 18 projects within and makes an air-tight joint with a housing 40 of bell-like form, the vertical walls of which dip into a water pool maintained in a subjacent slag-receiving trough 42, whereby the slag outlet is sealed against the surrounding atmosphere and permitting a suction to be created on the air supply conduit 36.

In operation, the combustible mixture of primary air and granular fuel enters the annular space of the upper end of the combustion chamber at a high velocity and burns in a whirling stream flowing in a helical converging path downwardly therein. The greater portion of the incombustible ash residue from the burning fuel is deposited on the combustion chamber walls in a molten condition to form a sticky layer thereon and the excess slag flows downwardly on the wall 16 and through the sealed slag outlet 18 into the trough 42. Due to the arrangement of and draft on the gas outlet 19 and the downwardly tapering formation of the combustion section 10ᵃ, the downward flow of the whirling stream of gaseous products of combustion tends to be retarded and turns inwardly towards the axis of the combustion chamber. A whirlpool effect results, with the static pressure along the axis lower than at the periphery. The flow of secondary combustion air induced through the air inlet 37 and the conduit 36 and upwardly through the combustion chamber tends to promote a secondary gas circulation, as indicated by the arrows in Fig. 1. The flotation effect of the air and gases in the lower section of the combustion chamber prevents any fuel fines which may still be present in suspension from passing downwardly to the slag outlet 18. Combustion of the fuel fines is rapidly completed by the ascending secondary air stream. The gaseous products of combustion flow upwardly through the gas outlet 19 into the secondary combustion chamber 24.

A recirculating gas duct 44 is arranged alongside the furnace chamber with its upper end connected to a suitable source of high temperature waste gases at a static pressure above that of the conduit 36, such as the annular space along the roof of the upper combustion chamber section 10 and its lower end connected to an intermediate portion of the conduit 36. With this arrangement high temperature gases can be drawn from the upper end of the combustion chamber downwardly through the duct 44 and mixed with the secondary air in the conduit 36. The recirculated gases serve to preheat the secondary air stream sufficiently to avoid undesirable cooling of the molten slag at the slag outlet 18 and on the downwardly tapering walls of the combustion chamber section 10ª and supplement the air in the desired flotation of the descending fine fuel particles and secondary gas circulation. The valve 38 is arranged and operable to control the proportions of secondary air and recirculated gases in the conduit 36.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. Apparatus for burning a slag-forming granular fuel having coarse and fine fuel particles under a furnace chamber temperature above the fuel ash fusion temperature which comprises a substantially cylindrical furnace chamber having a gas outlet throat projecting into one end thereof, means for introducing a combustible mixture of air and granular fuel in suspension tangentially into said furnace chamber around said gas outlet throat in a manner tending to cause fine fuel particles to separate therefrom and the remaining fuel particles to burn adjacent to the circumferential wall of said furnace chamber under molten slag-forming conditions, means forming an elongated conical extension of said furnace chamber symmetrically arranged at the end thereof opposite the chamber end through which projects said gas outlet throat, a molten slag outlet from said furnace chamber having its discharge end sealed from the atmosphere, a secondary combustion air inlet opening into the smaller end portion of said furnace chamber extension and providing an axial flow of air for the combustion of the separated fine fuel particles, and means for mixing recirculated gases from said furnace chamber with said secondary combustion air prior to its entry into said furnace chamber extension to preheat the secondary combustion air.

2. Apparatus for burning a slag-forming granular fuel having coarse and fine fuel particles under a furnace chamber temperature above the fuel ash fusion temperature which comprises a substantially cylindrical furnace chamber arranged with its axis substantially vertical and having a gas outlet in the upper end thereof, means for introducing a combustible mixture of air and granular fuel in suspension tangentially into said furnace chamber adjacent said gas outlet in a manner tending to cause fine fuel particles to separate downwardly therefrom and the remaining fuel particles to burn adjacent to the circumferential wall of said furnace chamber under molten slag-forming conditions, means forming an elongated conical extension of said furnace chamber at the lower end thereof and of greater axial length than the remainder of said furnace chamber, a molten slag outlet at the lower end of said furnace chamber extension, a secondary combustion air inlet opening into the lower end portion of said furnace chamber extension and arranged to provide an upward flow of air for the support and combustion of the separated fine fuel particles, and means for mixing recirculated gaseous products of combustion with said secondary combustion air prior to its entry into said furnace chamber extension to preheat the secondary combustion air.

3. Apparatus for burning a slag-forming granular fuel having coarse and fine fuel particles under a furnace chamber temperature above the fuel ash fusion temperature which comprises a substantially cylindrical furnace chamber arranged with its axis substantially vertical and having a gas outlet throat projecting into the upper end thereof, means for introducing a combustible mixture of air and granular fuel in suspension tangentially into said furnace chamber around said gas outlet throat in a manner tending to cause fine fuel particles to separate downwardly therefrom and the remaining fuel particles to burn adjacent to the circumferential wall of said furnace chamber under molten slag-forming conditions, means forming an elongated conical extension of said furnace chamber symmetrically arranged at the lower end thereof, said conical extension being of greater axial length than the remainder of said furnace chamber, liquid heating tubes arranged to cool the walls of said furnace chamber and conical extension, a molten slag outlet at the lower end of said furnace chamber extension and having its discharge end sealed from the atmosphere, a secondary combustion air inlet opening into the lower end portion of said furnace chamber extension and arranged to provide an axial flow of air upwardly therein for the support and combustion of the separated fine fuel particles, and means for mixing recirculated gases from the upper part of said furnace chamber with said secondary combustion air prior to its entry into said furnace chamber extension to preheat the secondary combustion air.

References Cited in the file of this patent

UNITED STATES PATENTS

| | | |
|---|---|---|
| 901,232 | Eldred | Oct. 13, 1908 |
| 1,180,792 | Norrman | Apr. 25, 1916 |
| 1,617,694 | Schwartz | Feb. 15, 1927 |
| 1,713,817 | Cotton | May 21, 1929 |
| 1,831,466 | Schmidt | Nov. 10, 1931 |
| 1,852,968 | Hillhouse | Apr. 5, 1932 |
| 2,088,879 | Stouff | Aug. 3, 1937 |
| 2,357,302 | Kerr et al. | Sept. 5, 1944 |
| 2,465,464 | Meyer | Mar. 29, 1949 |
| 2,516,141 | Newman et al. | July 25, 1950 |
| 2,527,934 | Jefferies | Oct. 31, 1950 |
| 2,573,910 | Kreisinger | Nov. 6, 1951 |

FOREIGN PATENTS

| | | |
|---|---|---|
| 16,270 | Australia | June 25, 1929 |
| 847,570 | France | July 3, 1939 |
| 305,270 | Great Britain | Feb. 1, 1929 |
| 302,255 | Great Britain | Dec. 11, 1928 |